(12) United States Patent
Yang

(10) Patent No.: US 6,400,746 B1
(45) Date of Patent: Jun. 4, 2002

(54) PUMP LASER WITH LOW GRATING REFLECTIVITY

(75) Inventor: Thomas C. Yang, North Chelmsford, MA (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 09/642,169

(22) Filed: Aug. 18, 2000

Related U.S. Application Data

(63) Continuation-in-part of application No. 09/501,809, filed on Feb. 10, 2000, which is a continuation-in-part of application No. 09/396,174, filed on Sep. 14, 1999, now abandoned

(60) Provisional application No. 60/136,628, filed on May 27, 1999.

(51) Int. Cl.⁷ .................................................. H01S 3/08
(52) U.S. Cl. ...................................... 372/102; 372/6
(58) Field of Search ................................... 372/6, 102

(56) References Cited

U.S. PATENT DOCUMENTS

| | | | |
|---|---|---|---|
| 4,950,318 A | 8/1990 | Dyott | 65/4.21 |
| 5,434,876 A | 7/1995 | Atkins et al. | 372/31 |
| 5,455,835 A | 10/1995 | Atkins et al. | 372/6 |
| 5,577,057 A | 11/1996 | Frisken | 372/18 |
| 5,828,059 A | 10/1998 | Udd | 250/277.18 |
| 5,841,797 A * | 11/1998 | Ventrudo et al. | 372/6 |
| 5,870,417 A * | 2/1999 | Verdiell et al. | 372/102 |
| 6,041,070 A * | 3/2000 | Koch et al. | 372/102 |
| 6,044,093 A * | 3/2000 | Ventrudo et al. | 372/102 |
| 6,058,131 A * | 5/2000 | Pan | 372/102 |
| 6,188,712 B1 * | 1/2001 | Jiang et al. | 372/102 |

FOREIGN PATENT DOCUMENTS

| | | |
|---|---|---|
| EP | 0 522 843 A2 | 1/1993 |
| GB | 2 298 733 | 9/1996 |
| JP | 57150810 | 9/1982 |
| WO | WO 98/10242 | 12/1998 |

OTHER PUBLICATIONS

Isshiki, K., et al., "A 980-NM Band Laser Diode Pump Source with a Detuned Wavelength of 1000 NM for Praseodynium-doped Fiber Amplifiers" Journal of Lightwave Technology, US, IEEE, NY vol. 16, No. 3, Mar. 1998 pp. 401–404.

Hunziker, W., et al., "Elliptically Lensed Polarisation Maintaining Fibres", Electronics Letters, GB, IEE Stevenage, vol. 28, No. 17, Aug. 13, 1992, pp. 1654–1656.

* cited by examiner

Primary Examiner—Leon Scott, Jr.
(74) Attorney, Agent, or Firm—Hamilton Smith Brook & Reynolds, P.C.

(57) ABSTRACT

A fiber grating stabilized pump laser achieves power stability with a relatively low grating reflectivity of 1.0 to 2.3%. Substantial laser diode output facet reflectivity is provided, between 3.0 and 5.5%. When the optical fiber system provides for no polarization control between the grating and the diode laser, the power reflectivity of the grating, is preferably between 1.7 and 2.3%. The power reflectivity of the laser diode output facet is preferably between 3.4 and 4.9%. In contrast, when provisions are made for polarization control between the grating and laser diode, even lower grating reflectivities are possible, between 1.0 and 2.3%.

19 Claims, 4 Drawing Sheets

PANDA
SLOW AXIS
FAST AXIS

3M ELLIPTICAL STRESS BAR

BOW TIE

REGULAR FIBER (NO STRESS BAR)

PUMP LASER WITH LOW GRATING REFLECTIVITY

RELATED APPLICATION

This application is a Continuation-in-Part of U.S. application Ser. No. 09/501,809, filed on Feb. 10, 2000, which is a Continuation-in-Part of U.S. application Ser. No. 09/396,174, filed on Sep. 14, 1999 now abandoned, and claims the benefit of the filing date of Provisional Application Ser. No. 60/136,628, filed May 27, 1999, the entire teachings of which are incorporated herein by this reference.

BACKGROUND

Laser diodes are used to optically pump optical fiber (gain fiber). The gain fiber can either be regular fiber in a Raman amplification scheme or rare-earth doped fiber, which has been spliced into the optical link to enable amplification of light signals. In common commercial products, 980 nanometer (nm) or 1480 nm diode lasers are used to optically pump erbium-doped fiber amplifiers operating or amplifying typically in a spectral range around 1550 nm.

In these diode pump-gain fiber systems, it is important to minimize changes in the amplifier characteristics due to changes in the pump wavelength or power. This is especially true in wavelength division multiplexing (WDM) systems or dense wavelength division multiplexing (DWDM) systems comprising many, spectrally closely-spaced channels. For example, mode hopping in the pump can cause changes in the gain spectrum of the amplifier. These changes result in preferential amplification of channels relative to other channels in the DWDM system.

One solution to controlling noise and wavelength shift due to environment temperature or power changes in the pumps uses fiber-grating stabilization. The Bragg grating has the effect of stabilizing the output spectrum from the laser pump or, more specifically, the grating stabilizes the pump against temporal power and frequency fluctuations. Further, in one suggested implementation, the grating is selected, spaced from the laser module, and tuned relative to the laser's exit facet reflectivity so that the spectrum of the emission is broadened relative to that of a solitary laser.

To further stabilize pump lasers, polarization control is many times useful. The light emitted from the output facet of the diode lasers is typically highly polarized. The polarization of the light propagating through regular, non-polarization maintaining fiber, however, can change its orientation due to fiber birefringence, fiber twisting, bending, temperature shifts, and other stresses. Any fluctuation in the polarization of the light returning to the optical device from the grating effectively changes the feedback power ratio, because the laser is insensitive to any reflected light that has a polarization orthogonal to that of the emitted light. For example, if all of the reflected light has its polarization rotated by 90 degrees, the fiber Bragg grating is effectively removed from the system from the laser's perspective.

In applications where polarization control is required between the laser diode and the grating, polarization-maintaining (PM) fiber is used for the fiber pigtail, with the grating being written into the PM fiber.

SUMMARY

There are many different approaches to selecting facet and fiber grating reflectivities. Generally, the optimization seeks to maximize the pump module output, while minimizing temporal power fluctuations.

One approach suggests the use of an antireflected-coated laser diode output or exit facet. This yields a laser diode exit facet that has very low reflectivity, typically on the order of less than 0.5% power reflectivity. The grating reflectivity is then selected to both maintain good temporal power stability while obtaining good power output from the laser diode.

The problem with this approach is that, in optical pumping applications, the total power output from the laser diode is typically a critical design criteria. It can result in a fewer number of laser diodes being required to obtain a specified pumping power in the gain fiber. If the grating is used to provide both the power stabilizing feedback, but also the feedback to create laser operation, there is only a single variable—grating reflectivity—to optimize two parameters, total laser power output and laser power stability. In addition, very low reflectivity laser diodes (<0.5%) can be hard to make, evaluate, test and screen during the manufacturing process.

As a result, another approach seeks to optimize fiber grating stabilized diode pump lasers by specifying a specific ratio between front facet reflectivity and effective grating reflectivity, taking into account the two-way coupling efficiency between the fiber pigtail and the laser diode. The problem with this approach, however, is that it fails to contemplate real-world manufacturing tolerances and specifications. To achieve acceptable yields, only ranges of front facet reflectivity, grating reflectivity, and coupling efficiency can be specified. Coupling efficiency varies with laser to fiber alignment success and culminating lens placement/alignment focusing. Fiber grating manufactures typically only provide fiber gratings having a reflectivity within a 0.5 to 1% range at reasonable costs. Finally, exit facet reflectivity can vary as much as one percent in laser diode chips manufactured from the same wafer.

As a result, according to one aspect, the invention features a fiber-grating stabilized pump module. It comprises a laser diode chip having an output facet and an optical fiber system into which light exiting from the optical facet of the laser diode is coupled. A grating is formed in the optical fiber of the optical fiber system. The grating is used to provide feedback to the laser diode to thereby promote power stability of the pump module.

According to the invention, the power reflectivity of the grating and the output facet are specified in absolute terms. Specifically, the power reflectivity of the grating is 1.0% to 2.3%, and the power reflectivity of the output facet is between 3.0 and 5.5%.

In specific embodiments, the coupling efficiency between the laser diode and the optical fiber system is between 70 and 82%.

When the optical fiber system comprises only regular fiber, with no polarization control or maintenance, a grating power reflectivity of 1.7 to 2.3% is considered to be preferable. Further, the output facet reflectivity is preferably between 3.4 and 4.9 percent.

In contrast, when the optical fiber system comprises polarization maintaining fiber, the grating reflectivity is preferably between 1.0 and 2.3%. Again, a power reflectivity of the output facet of 3.4 to 4.9% is preferable.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the drawings, like reference characters refer to the same parts throughout the different views. The drawings are not necessarily to scale, emphasis instead being placed upon illustrating the principles of the invention. Of the drawings.

DETAILED DESCRIPTION OF THE PREFERRED EMBODIMENTS

Figure 1:
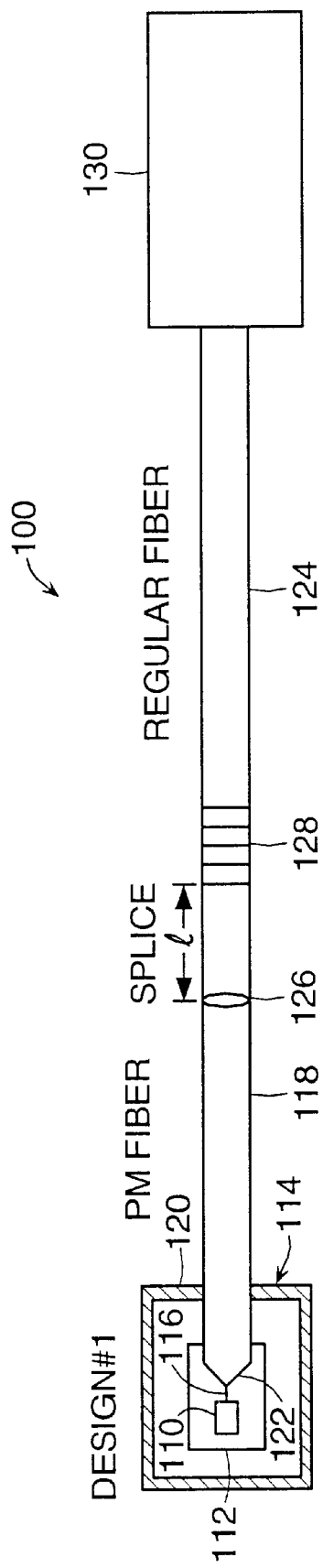
FIG. 1 is a block diagram of the fiber-grating stabilized pump laser component according to the present invention.
Figure 2:
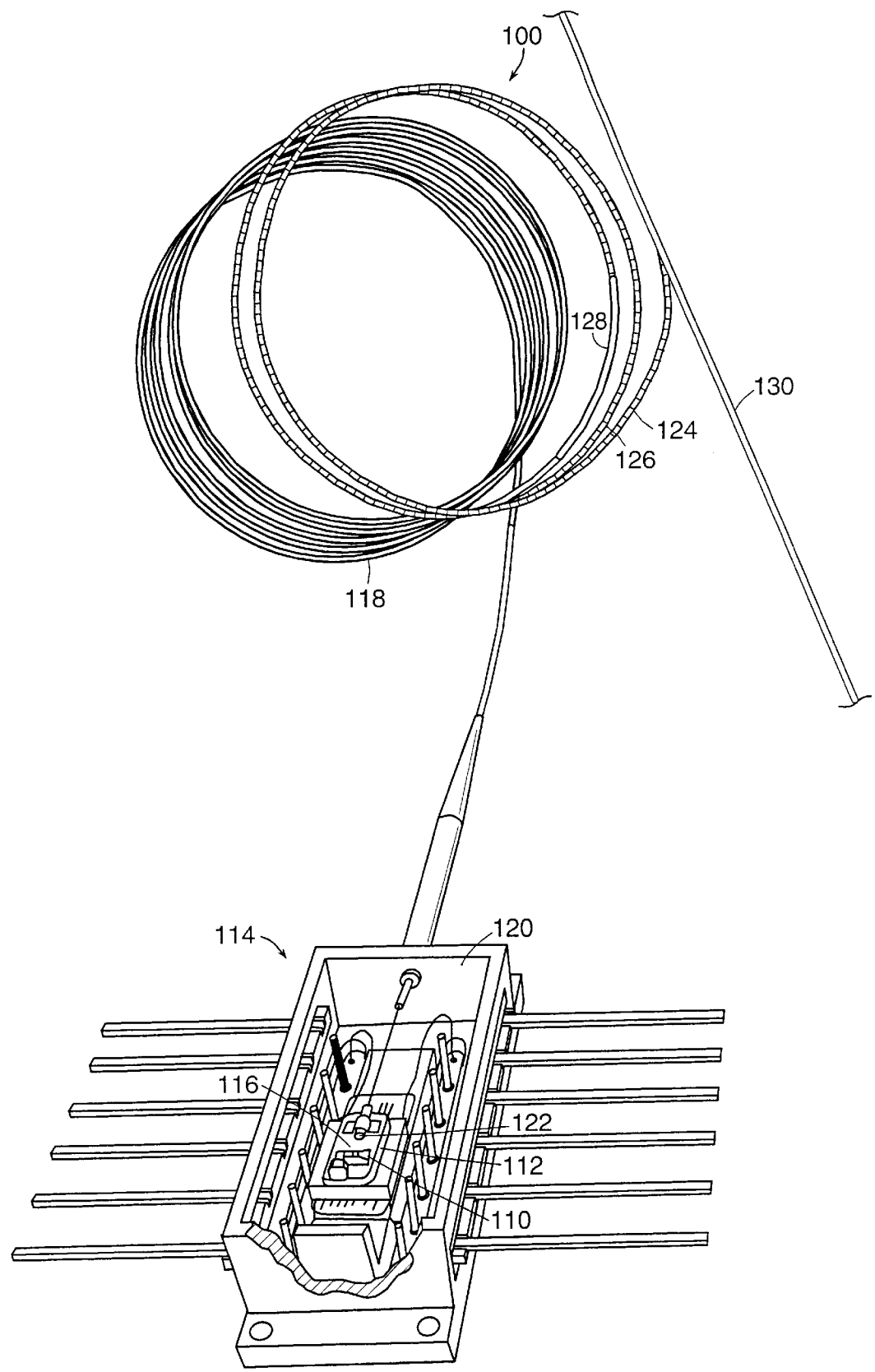
FIG. 2 is a perspective, schematic view of the fiber-grating stabilized pump laser component according to the present invention.

FIGS. 1 and 2 shows a fiber-grating stabilized pump laser component, which has been constructed according to the principles of the present invention.

Specifically, an optical source 110, such as a laser, specifically, pump laser or amplifier, is installed on a submount 112 in the typical implementation. The submount 112 provides mechanical and electrical connections between the laser diode 110 and the module housing 114. An optical fiber system is used to transmit the light generated by the laser diode 110 to the next device or system 130. In the preferred implementation, this system is a fiber amplifier system with the light being used to pump the fiber amplifier 130. For example, the diode pump component 100 can be attached to the fiber amplifier through a WDM coupler to provide the pump light into the fiber amplifier's core.

The optical fiber system comprises a fiber pigtail 118, which extends through a side wall 120 of the module housing 114. It is typically rigidly secured to the submount 112 such that the fiber endface 122 is held in proximity to an output facet 116 of the laser diode 110.

The fiber pigtail 118 is preferably constructed from polarization-maintaining fiber. Different types of polarization-maintaining fiber are applicable. For example, panda, elliptical stress bar, elliptical core, and bow tie may be used in addition to other fiber types such as polarization controlling fiber which has only a single transmission axis.

Figure 3A:
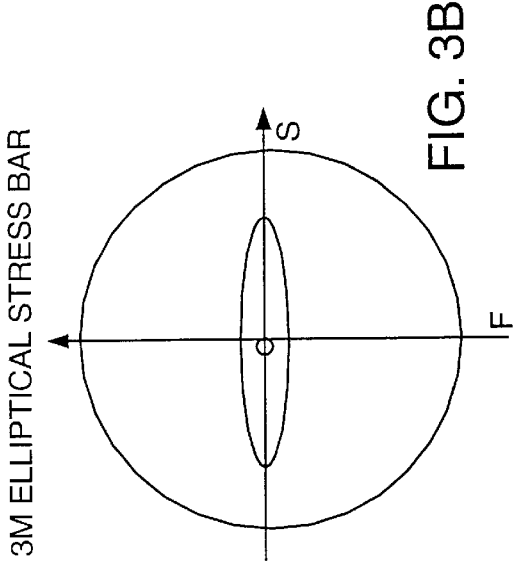
FIGS. 3A–3D are schematic, cross-sectional views of a few exemplary PM and non-PM fibers.
Figure 3B:
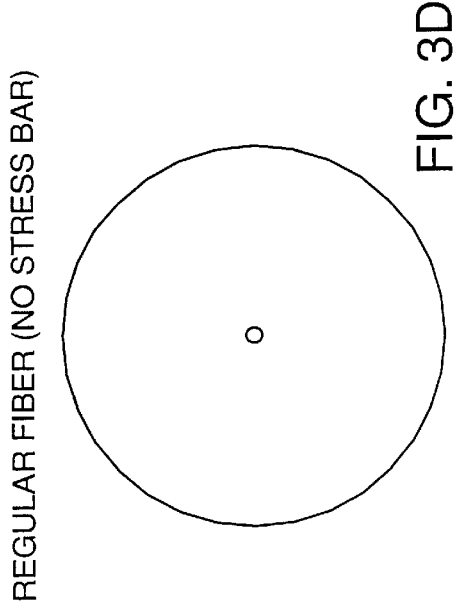
Figure 3C:
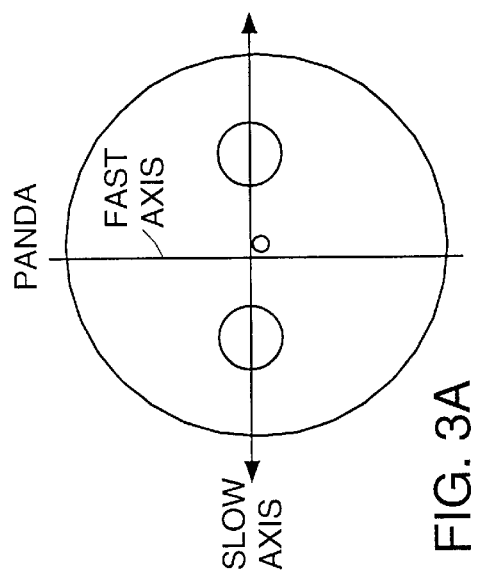

FIGS. 3A through 3C are cross-sectional views illustrating a few exemplary types of PM fiber deployable with the present invention, specifically panda, elliptical stress bar, and bow tie, respectively. Each of these PM fiber types is doped to yield a fast and slow axis of light transmission. Light that is coupled into the fiber and polarized along one of these axes is restricted to maintain its polarization with respect to the axes.

In other embodiments, the fiber pigtail 118 is constructed from a type of polarization-maintaining fiber that is termed polarization-controlling fiber. This fiber type only propagates light with a single polarization. Moreover, the pigtail is constructed from regular, non-polarization-maintaining fiber in still other embodiments.

Returning to FIGS. 1 and 2, the present invention contemplates the various techniques used for ensuring a high collection efficiency for light exiting from the light output facet 116 of the laser diode into the fiber pigtail 118. Specifically, discrete lenses, butt coupling, and microlenses are various alternatives. Presently, flat top microlenses are used as described in the application entitled "Flat Top, Double-Angled, Wedge-Shaped Fiber Endface", U.S. Ser. No. 08/965,798, by Jeffrey Korn, Steven D. Conover, Wayne F. Sharfin and Thomas C. Yang, which is incorporated herein by this reference.

The advantage of double-angle flat top microlenses is the fact that they are not circularly symmetric, i.e., with respect to the fiber's axis, to thereby match the elliptical spatial distribution of light from the output facet of the laser diode. In this vein, however, cylindrical fiber lenses or a cylindrical discrete lenses are another alternative.

When non-circularly symmetric coupling techniques are used, it is important to align the discrete or formed microlens, for example, with one of either the fast or slow axes of the polarization-maintaining fiber.

Figure 4:
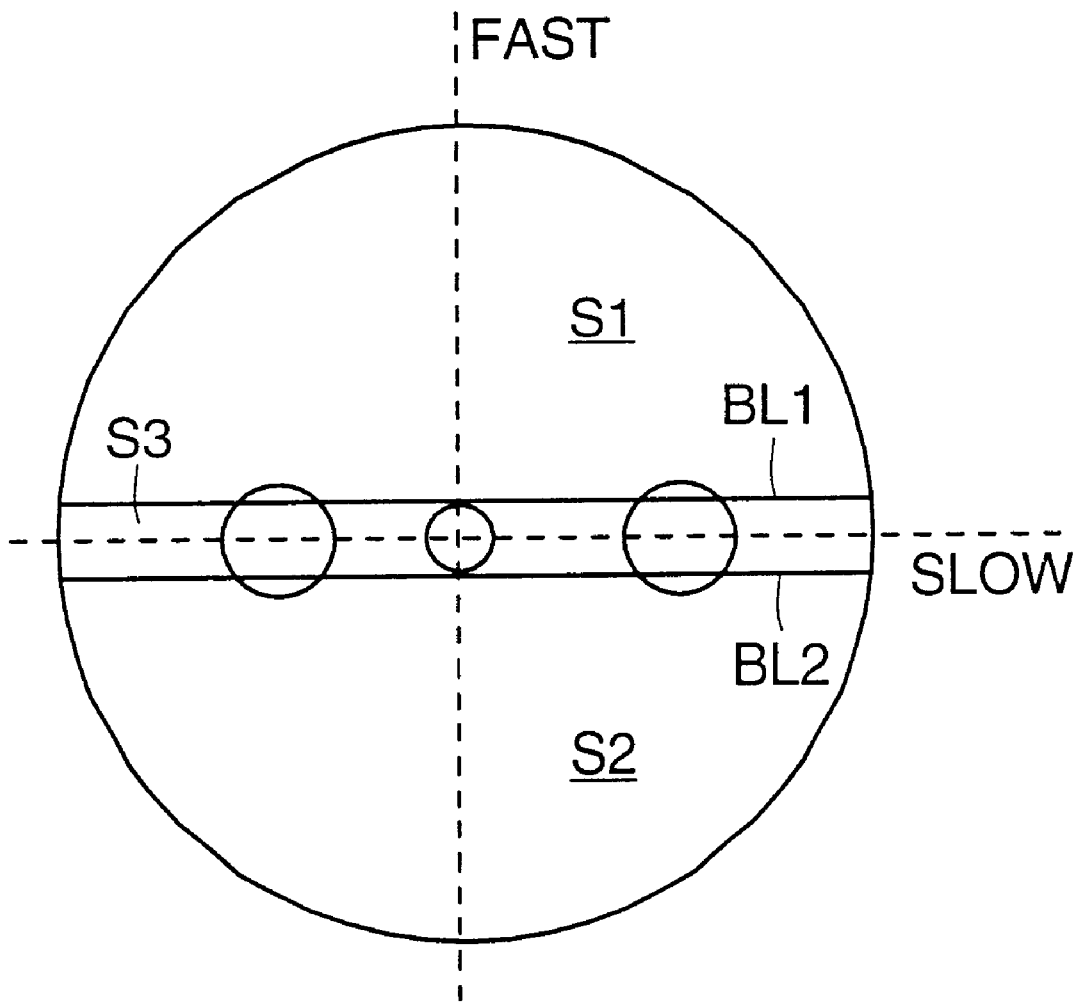
FIG. 4 is a plan view showing the relationship between the PM fiber's axes and micro lens on the end of the fiber pigtail.

FIG. 4 illustrates the relationship between the double-angle flat top microlens and the PM fiber's transmission axes. Specifically, breaklines BL1, between polished surface S1 and cleaved flat top surface S3, and breakline BL2, between top surface S3 and polished surface S2, are substantially aligned with one of the PM fiber's axes. Here, the breaklines BL1 and BL2 are aligned with the slow axis. It is equally valid to align the breaklines BL1 and BL2 with the fast axis, in alternative embodiments.

This coupling system ensures a high power coupling efficiency between the laser diode and the optical fiber system and specifically the grating. In present implementations, the efficiency is between 70% and 82%.

In the present invention, the accuracy of the alignment is between zero and five degrees relative to either the fast or slow axis. That is, there is less than 5 degrees of angular difference between the breaklines BL1, BL2 and the selected fiber transmission axis. Preferably, however, the alignment is between 0 and 2°. This level of alignment ensures that little light is coupled to travel along the nonfavored axis of transmission, and thus maximizing the polarization-controlling effect of the fiber pigtail 118.

The polarization control maximizes and stabilizes the effect of the fiber grating. Light exiting from the typical diode laser is polarized. As a result, any light that is coupled into the other, non-favored fiber axis, i.e., the axis of the fiber that is not aligned with the polarization of the laser diode, is reflected by the grating, but has little effect on the laser diode since the diode is nonresponsive to light of this polarization.

Figure 3D:
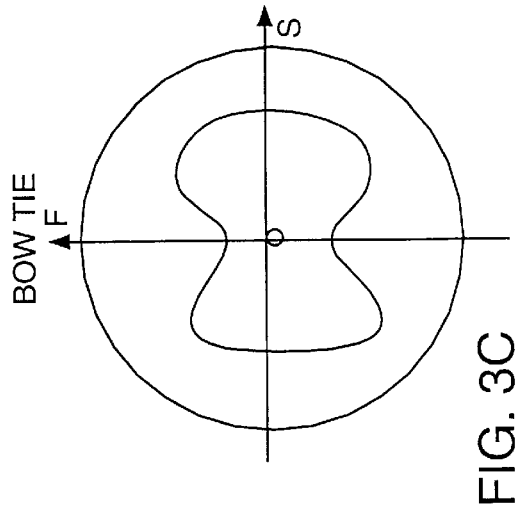

Returning to FIGS. 1 and 2, the polarization-maintaining fiber pigtail 118 is optically coupled to a strand of regular fiber 124 via splice 126. Regular fiber preferably has a standard circular cross section core, i.e., has no stress bar, or no fast or slow axes, as illustrated in FIG. 3D.

Although the coupling between the polarization-maintaining fiber pigtail 118 and regular, non-polarization-maintaining fiber 124 is shown as a direct fusion splice. The critical feature is the optical coupling between the two fibers. Thus, other techniques for obtaining this coupling can be used such as intervening fiber lengths of a third fiber.

In a similar vein, the PM fiber need not directly receive the light from the diode. Instead, the light can be first coupled into a relatively short length of regular fiber for example, and then into PM fiber, which transmits the light over most of the distance to the grating. This is not preferred, however, because of the need for additional splicing.

Moreover, in some cases only non-PM is used between the diode and the grating.

A grating 128 is written into the regular fiber 124. These gratings are typically manufactured by UV beam interference. The gratings are usually written to the depth of the core in the fiber.

In one implementation, the fiber grating 128 provides reflectivity at about 980 nm, which is within the gain bandwidth of the diode laser 110. Further, the fiber grating has a bandwidth of 0.4–1 nm, preferably.

Moreover, in still another implementation, only PM fiber is used between the diode 110 and the grating 128, with the grating being written in the PM fiber. This is the simplest design from a component count perspective, but suffers from higher component costs associated with the PM fiber grating and more stringent manufacturing tolerances.

Preferably, the grating has a power reflectivity of about 1.0% to 2.3%; and the front facet power reflectivity of the diode laser is 3.0% to 5.5%. Preferably, the front facet reflectivity for the diode has tighter specification. Specifically, the front facet reflectivity is between 3.4 and 4.9%.

Preferably, the grating power reflectivity is between 1.0% to 2.3% when the optical fiber pigtail system provides for polarization control between the grating 128 and the laser diode 110, i.e., when there is polarization-maintaining or polarization-controlling fiber optically interposed between the grating and diode.

When the optical fiber pigtail system uses regular fiber without polarization controlling characteristics, i.e., the optical fiber pigtail system does not provide for polarization control between the grating 128 and the laser diode 110, higher grating reflectivity is typically required to ensure that the diode does not become unlocked on the grating. Specifically, a grating reflectivities in the range of 1.7 to 2.3% are used.

In other implementations, also involving erbium-doped fiber amplifiers, the grating 128 is reflective at 1480 nm. In implementations using Raman amplification, the grating has a bandwidth of 0.5–20 nm with a reflectivity peak in the range of 1060–1600 nm.

Important to the performance of the inventive systems is the distance (1) between the splice point 126 and the grating 128, when the splice is present. Generally, this distance should be kept short to minimize the region without polarization control between the laser diode 110 and grating 128. In the preferred embodiment, the distance (1) is 50–150 mm, but can be a wider range such as 0 mm to 500 mm.

In the preferred embodiment, the regular fiber 128 transmits the signal from the optical device 110 to the next device or system 130. In the preferred implementation, this system is a fiber amplifier system with the light being used to pump the fiber amplifier 130. For example, the diode pump component 100 can be attached to the fiber amplifier through a WDM coupler to provide the pump light into the fiber amplifier's core.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A fiber-grating stabilized pump module, comprising:
   a laser diode chip having an output facet;
   an optical fiber system into which light exiting from the output facet of the laser diode is coupled;
   a grating, written into optical fiber of the optical fiber system, the grating providing feedback into the laser diode to thereby promote power stability of the pump module;
   wherein a power reflectivity of the grating is between 1.0% and 2.3% and a power reflectivity of the output facet is between 3.0% and 5.5%.

2. A fiber-grating stabilized pump module as claimed in claim 1, wherein a coupling efficiency between the laser diode chip and the optical fiber system is between 70% and 82%.

3. A fiber-grating stabilized pump module as claimed in claim 1, further comprising a module housing; the laser diode being housed within the module housing, the optical fiber system extending through a wall of the housing to terminate in proximity to an output facet of the laser diode.

4. A fiber-grating stabilized pump module as claimed in claim 1, wherein the optical fiber system further comprises a fiber microlens for facilitating coupling of light from the laser diode into the optical fiber system.

5. A fiber-grating stabilized pump module as claimed in claim 1, wherein a power reflectivity of the output facet is between 3.4% and 4.9%.

6. A fiber-grating stabilized pump module as claimed in claim 1, wherein the optical fiber system comprises only regular fiber between the laser diode chip and the grating.

7. A fiber-grating stabilized pump module as claimed in claim 6, wherein the power reflectivity of the grating is between 1.7% and 2.3%.

8. A fiber-grating stabilized pump module as claimed in claim 7, wherein a power reflectivity of the output facet is between 3.4% and 4.9%.

9. A fiber-grating stabilized pump module as claimed in claim 8, wherein the optical fiber system further comprises a fiber microlens for facilitating coupling of light from the laser diode into the optical fiber system, the microlens being circularly symmetric relative to an axis of the optical fiber system.

10. A fiber-grating stabilized pump module as claimed in claim 7, wherein the grating is written into the non-polarization-maintaining fiber.

11. A fiber-grating stabilized pump module as claimed in claim 1, wherein the optical fiber system comprises polarization-maintaining fiber optically interposed between the laser diode chip and the grating.

12. A fiber-grating stabilized pump module as claimed in claim 11, wherein a power reflectivity of the output facet is between 3.4% and 4.9%.

13. A method of stabilizing the output of an optical component, the method comprising:
    generating light in a laser diode;
    coupling the light from the laser diode into optical fiber;
    stabilizing a power of the light produced by the optical component with a grating providing feedback into the laser diode; wherein
    between 3.0% and 5.5% of the power from an exit facet of the laser diode is fed back into the laser diode; and wherein
    between 1.0% and 2.3% of the power from the grating is fed back into the laser diode to stabilize the power of the optical component.

14. A method as claimed in claim 13, further comprising providing a coupling efficiency between the laser diode chip and the optical fiber system of 70% to 82%.

15. A method as claimed in claim 13, further comprising providing only regular fiber between the laser diode chip and the grating.

16. A method as claimed in claim 15, farther comprising feeding-back 1.7% to 2.3% of the power from the grating.

17. A method as claimed in claim 16, further comprising feeding-back 3.4% to 4.9% of the power from the exit facet.

18. A method as claimed in claim 13, further comprising controlling the polarization of light propagating between the laser diode and the grating.

19. A method as claimed in claim 18, further comprising feeding-back 3.4% to 4.9% of the power from the exit facet.

* * * * *